July 1, 1924.

R. R. BLOSS 1,499,500

BULL WHEEL STRUCTURE

Filed Feb. 6, 1922     2 Sheets-Sheet 2

Richard R. Bloss
INVENTOR.

BY Edwin P. Corker
ATTORNEY.

Patented July 1, 1924.

1,499,500

UNITED STATES PATENT OFFICE.

RICHARD R. BLOSS, OF COLUMBUS, OHIO, ASSIGNOR TO THE INTERNATIONAL DERRICK & EQUIPMENT COMPANY, OF COLUMBUS, OHIO, A CORPORATION OF OHIO.

BULL-WHEEL STRUCTURE.

Application filed February 6, 1922. Serial No. 534,468.

*To all whom it may concern:*

Be it known that RICHARD R. BLOSS, a citizen of the United States of America, residing at Columbus, in the county of Franklin and State of Ohio, has invented certain new and useful Improvements in Bull-Wheel Structures, of which the following is a specification.

My invention relates to bull wheel structure and has to do primarily with the provision of a novel structure of bull wheel parts that are designed to facilitate the assembling of these parts and at the same time to produce a structure of superior flexibility and strength for any given weight of material.

One of the important features of my invention has to do with the provision of spaced rim angles that are mounted for adjustment towards and from each other to facilitate the reception of filler block structure of varying form and thickness. I preferably accomplish this by the utilization of a plurality of spoke members that are rigidly connected to the hubs of the tug and brake wheels, but which are so connected to the rim angles at their outer ends and are of such flexibility that they may be adjusted into varying positions to effect adjustment of the rim angles for the purposes indicated.

Another important feature of my invention has to do with the provision of a novel type of metal spoke structure. Briefly stated, each of the spokes of my bull wheel structure are connected to their hubs by a plurality of bolts so disposed as to insure a cantilever beam action. The outer ends of these spokes are connected to the rim angles in such a way that the rotative stress upon the wheels will bring the spokes into tension, with the result that the cantilever action and the tension action of the spokes will serve to counteract each other.

A further important feature of my invention has to do with a novel method of attaching the gudgeon of a bull wheel structure so that it will be easily removable. My gudgeon structure is preferably formed with a tapered portion which will fit into the tubular shaft of the bull wheel structure with such a wedging action as to eliminate backlash or looseness. Furthermore, this wedging action will also provide a certain amount of adjustment and permit a take-up means to offset any wear that may occur in the use of the apparatus. It is a fact that the tubular shafts of the bull wheel structures commonly in use, though of uniform outside diameter, are of varying interior diameter and contour. My novel wedge structure affords a simple and effective means of compensating for any variations either as to actual internal diameter of the tubular shaft or as to variations of internal contour. In addition, my gudgeon is secured in place by bolts which are so disposed that any tendency of the gudgeon to pull off of the shaft will be counteracted by the tension of the bolts.

Various other features of importance will appear as this description progresses. The preferred embodiment of my invention is shown in the acompanying drawings, wherein similar characters of reference designate corresponding parts, and wherein—

Figure 1:
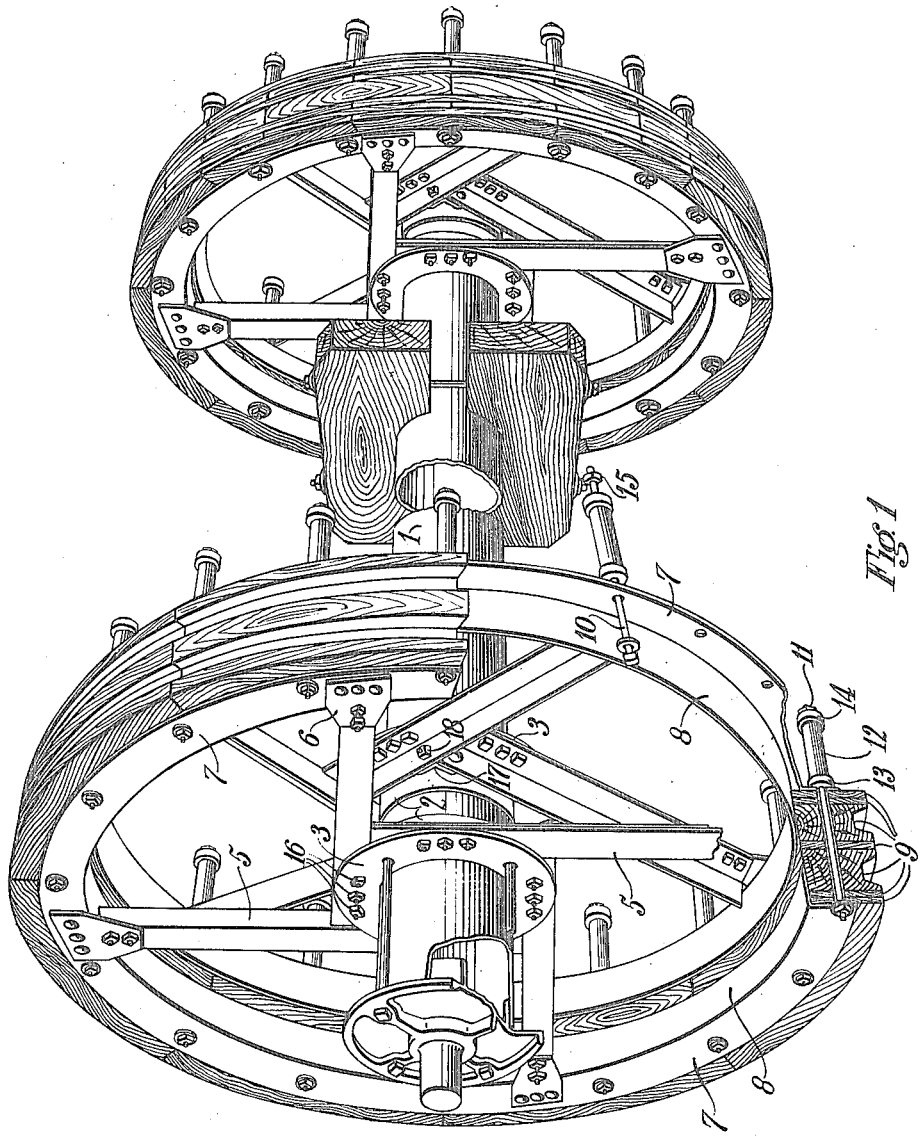
Figure 1 is a perspective view of a bull wheel structure in accordance with my invention.

In the drawings, my bull wheel structure is shown as comprising a tubular shaft 1 carrying adjacent one end a tug wheel and adjacent the other end a brake wheel. The essential units of these tug and brake wheels are the same, the only difference being that the tug wheel is provided with rope grooves while the brake wheel is provided with a friction brake surface, which will be well understood by those familiar with the art. In view of the fact that the essential units of these two wheels are the same, these units will only be described in connection with the tug wheel.

Figures 3, 4:
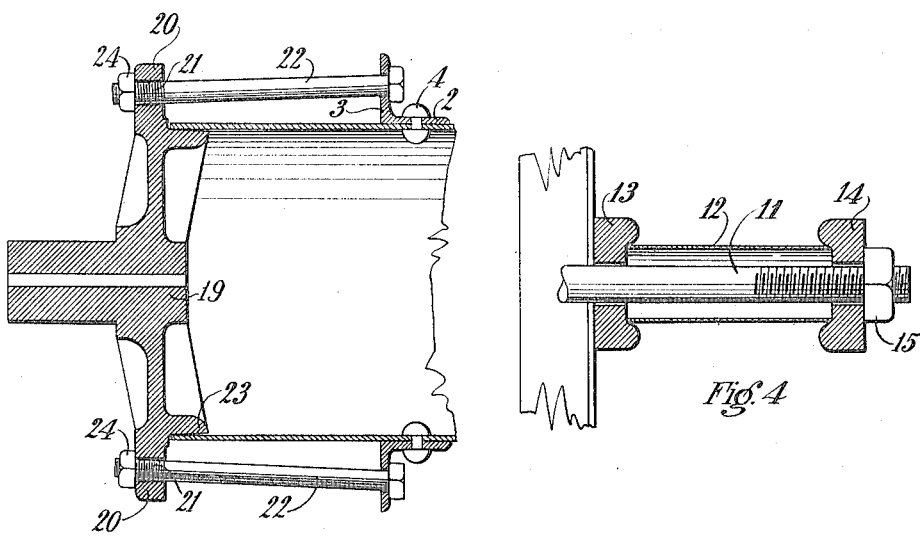
Figure 3 is a detail in section of my gudgeon structure and the manner of attaching the same.
Figure 4 is a detail in section showing the structure of one of the handles carried by the wheel structure.

The hub structure of my novel type of tug wheel takes the form of annular angle members having horizontal legs 2, as shown in Figure 3, and vertical legs 3, as shown in Figures 1 and 3. The horizontal legs 2 are preferably riveted to the tubular shaft 1 as at 4. Each hub structure comprises two of these annular angle members with their horizontal legs extending inwardly toward each other and spaced apart and with their vertical legs arranged in parallelism.

In its preferred embodiment, my invention contemplates the provision of a plurality of spokes 5 connected to the vertical legs of one annular angle and a similar set of spokes connect the vertical legs of the opposing and complemental angle. It will be noted by reference to Figure 1 that these two sets of spokes are staggered with relation to each other. This will produce a comparatively simple structure which is yet amply rigid to stand the strains to which the wheels is subjected.

These spokes 5 are preferably angle iron members which are disposed tangentially to the hub structure and which are connected at their outer ends by means of plates 6 to annular rim angles. The annular rim angles are substantially identical, one rim angle being connected to the outer ends of each set of spokes by the plate 6 as indicated. They comprise vertical legs 7 and laterally extending legs 8. The laterally extending legs 8 extend inwardly toward each other and they cooperate to form a single channel structure for the reception and support of the cants.

It will be noted that the adjacent laterally extending legs 8 of the annular rim angles are spaced from each other as shown in Figure 1. This space, however, is variable due to the fact that the annular rim angles are designed and mounted for adjustment toward and away from each other in order to accommodate different thicknesses of cant structure. This is made possible by the inherent elasticity of such a structure as my combination of hub, arm and rim. The cants are designated 9 and it will be understood that they may vary in number and thickness. They are retained in position within the channel formed by the annular rim angles by means of bolts 10 which extend through the vertical legs of the rim angles and which are utilized to draw the rim angles and the outer ends of the spokes toward each other to a greater or lesser extent. The variation of width made possible by this structure is not a great one but is highly important in that it permits sufficient adjustment to insure a clamping action on a group of cants laminated together to form an approximate predetermined width.

It is well known to one familiar with the art that any cant of specified thickness may run either slightly over or slightly under the specification. This variation is due sometimes to the lack of care and effort in manufacturing and sometimes to swelling or shrinkage as a result of atmospheric changes and sometimes to a combination of all these factors. My adjustment in rim spacing is sufficient to compensate for these variations as pointed out, thus providing a highly important means for making possible the use of the material already in the field without the necessity for reconstruction, or fitting.

It is worthy of note that the bolts 10 are provided with extensions 11 beyond the sides of the wheels. These extensions 11 are preferably equipped with handles 12 which are of a structure shown in Figure 4. In this figure, it will be seen that the handles 12 take the form of a pipe structure which is disposed in an enclosing concentric relation to the bolt and which is held in this position by a pair of washers 13 and 14. The washer 13 will normally bear against the side of the wheel, while the washer 14 will bear against the outer end of the pipe 12 and will be held firmly against the same by the nut 15. The result is that any bending force applied to the pipe will not be resisted by the stiffness of the bolt alone, but will be resisted in a large measure by a tension in the bolt produced by a compression force in the pipe wall and acting against the sides of the wheel structure and the members 13 and 14.

Referring again to the spoke structure, it will be noted that each spoke is connected at its inner end to the hub structure by a series of three bolts 16. In addition each spoke is attached to the adjacent abutting spoke by means of an angle member 17, one leg of which is permanently fixed to the horizontal leg of the abutting spoke in such a relation that the remaining leg of member 17 is brought into flat contact with the horizontal leg of the adjacent spoke and detachably held in this relation by means of bolt 18. These connections are arranged so that each spoke acts as a cantilever beam, with the result that any rotative stress applied to the wheel will produce a bending moment in each spoke. In addition, the spoke is so connected to the rim structure that the rotative stresses applied to the wheel also subject the spokes to tension.

Figure 2:
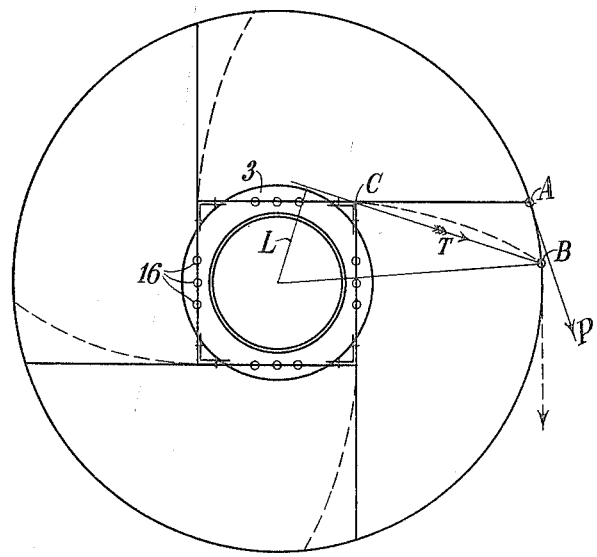
Figure 2 is a diagrammatic view illustrating the counteractive effect of the cantilever bending and tension forces of my spoke structure.

In transmitting a torque force from the rim structure to the hub structure, the combination and action of the resulting stresses are described as follows:

In Figure 2, let A represent the attachment of the spoke to the rim and P represent any tangential torque force acting through the rim to point A. As the force P is applied, stresses in the structure are developed which cause the point A to be deflected from its position of no load. This is due to the fact that the materials from which the structure is made are elastic and to the well known law of mechanics that proportionate deformations are always a result of stresses in any structure built of elastic materials.

Let point B represent the deflected position of A when under load. It is apparent from Figure 2 that the length from C, the fixed end of the spoke, to A is less than from C to B. Hence a tension, T, acting through the point B and substantially in the direction shown, produces a torque equal to the product of T and L, L being the perpendicular distance to the line of action of the force T drawn through the center of rotation of the bull wheel structure. Thus it is clearly shown that a tension is developed in the spokes which directly produces a turning moment.

It is now clearly evident that the torque thus produced reduces the bending moment in the spoke.

My novel gudgeon structure is shown best in Figures 1 and 3. It comprises the gudgeon 19 having the annular flange 20 with bolt holes 21 spaced around the same at regular intervals and designed to be held in place upon the tubular shaft by means of tension bolts 22 passing through the hub angle 3. Extending inwardly from the angle flange 20, I have provided a tapered or wedge-like circular flange 23 whose exterior will approximate the internal contour of the normal tubular shaft suitable for bull wheel construction. Preferably, the greatest external diameter of the flange 23 is slightly greater than the internal diameter of this tubular shaft. The result is that any tightening of the nuts 24 will draw the circular flange 23 with a wedge-like action into the interior of the tubular shaft. Thus, a tight fit will be effected with a tubular shaft of normal type and structure even though the diameter thereof may differ somewhat from normal and even though the interior contour thereof may likewise differ. The result is that all looseness of fit and danger of backlash is avoided and the gudgeon is held firmly and rigidly in place upon the shaft.

Having thus described my invention, what I claim is:

1. In bull wheel structure, a wheel comprising independent separately supported units, the outer portions of each unit being bodily movable to accommodate cant structures of different widths.

2. In bull wheel structure, a wheel comprising spaced wheel units each made up of a rim element and spokes integrally mounted and connected to a hub member, said units being sufficiently flexible to permit of relative movement about said hub as a support.

3. In bull wheel structure, a single wheel comprising two relatively distinct units, each of which comprises a hub member, spokes, and a separately supported unit, said distinct units being spaced apart but being of such flexibility to permit of relative adjustment at their peripheries to accommodate cant structures of different widths.

4. In bull wheel structure, a wheel comprising separately supported continuous rim members, a hub member, said supporting means being integrally connected to said hub and rim members to form two unitary and independent units.

5. In bull wheel structure, a wheel comprising a shaft, parallel rim elements, spoke series separately connecting said rim elements to said shaft, the spokes of each series being tangentially connected to said shaft and so connected to said rim members that an applied torque will produce counteracting bending and tension stresses.

6. In bull wheel structure, a wheel comprising a shaft, parallel continuous rim elements, spoke series separately connecting said rim elements to said shaft, the spokes of each series being tangentially connected to said shaft and arranged in staggered relation to each other.

7. In bull wheel structure, a tubular shaft, a tapered circular gudgeon having a telescoping contact within one end of said shaft and means positioned outside of said tubular shaft and connecting said gudgeon and said shaft for maintaining said telescoping relation by tension stresses.

8. In bull wheel structure, a wheel comprising a channel rim member constructed of opposing independent angle irons, said angle irons being integrally mounted upon the wheel spokes and means for bodily adjusting said angle irons and spokes to vary the width of said channel.

9. In bull wheel structure, a plurality of separate spoke series, relatively spaced annular rim elements separately connecting the outer ends of the spokes of each series in the plane of the wheel, said rim elements being bodily adjustable at right angles to the plane of the wheel.

10. In bull wheel structure, comprising a tubular shaft, a wheel, means carried by the shaft for supporting the inner ends of the wheel spokes, gudgeon structure removably applicable to the end of said shaft having a radially extending flange and an inwardly tapered flange, and means connecting said first named means and said radially extending flange for securing the gudgeon to the shaft.

In testimony whereof I hereby affix my signature.

RICHARD R. BLOSS.